May 22, 1951 M. PEIGNEY 2,553,722
APPARATUS FOR RETREADING PNEUMATIC TIRES
Filed Aug. 15, 1947 2 Sheets-Sheet 2

Inventor
Maurice Peigney,
By Wenderoth, Lind & Ponack
Attorneys

Patented May 22, 1951

2,553,722

UNITED STATES PATENT OFFICE 2,553,722

APPARATUS FOR RETREADING PNEUMATIC TIRES

Maurice Peigney, Chateau-Thierry, France, assignor to Caoutchouc Industriel et Derives "Cid," Geneva, Switzerland, a corporation of Switzerland Application August 15, 1947, Serial No. 768,827
In France January 20, 1947

4 Claims. (Cl. 18—18)

My present invention has for its object to provide a device for retreading tires in the most favourable conditions, said device being characterised by the following features:

1. It allows pressure being applied exclusively at the points to be vulcanised.
2. It enables accurate compensation of wear in the tire by adding an amount of gum adapted to restore the dimensions of a new tire.
3. It enables said gum to be cured under maximum pressure.
4. It enables the sides of the tire to be left entirely free during the vulcanising process.
5. It enables treatment of tires of varying cross sections with a reduced number of moulds.

To achieve the above mentioned objects, I use the general method which comprises placing the tire preliminarily thickened with gum between a mould encasing the sides and the tread of the tire, and a rubber roll or bead within which pressure is applied. To any point of the external surface of the rubber bead there corresponds a point of the mould. The result is that the pressure applied exclusively in the vulcanised zones is perfectly withstood by the outer mould while the fabric webs in the tire are not subjected to any internal stress whatever.

Another feature of the invention lies in the fact that the rubber bead or roll is subjected to pressure through blocks a peculiarity of which is that they act through the medium of an area of trapezoidal cross section exerting radial stress; thus the rubber bead distributes the pressure throughout its entire substantially semi-circular section in a substantially similar manner to what would be the action of a fluid.

According to the device of the invention the sides and the beads of the tire remain absolutely free upon assembly, which avoids burning the sides and distending the webs. Moreover, moulds are provided which are formed in two parts adapted to be spaced more or less far apart from each other by means of interchangeable shims; this makes it possible to compensate for any differences in section which may exist between various tires originally of the same dimensions but having been subjected to different degrees of wear, and more generally permits handling tires of various cross section by means of a reduced number of moulds.

There has been shown in the accompanying drawings one embodiment of a mould according to the invention together with the entire equipment providing for control of the movements of the various portions of the mould. In the drawings.

Figure 1:
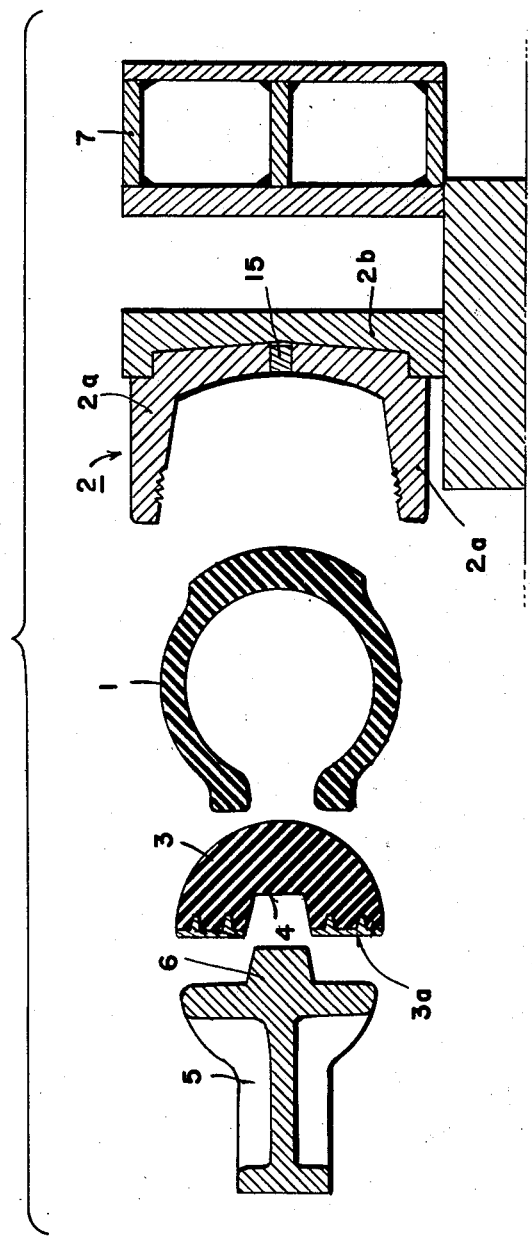
Fig. 1 is a diagrammatical view in cross section showing the mould, the tire and the various adjacent elements in exploded view.

Referring to Fig. 1 it may be seen that the tire 1 appearing in cross section is arranged between a mould 2 and a rubber bead 3 the cross section of which is peculiar in that it presents a trapezoidal groove 4 through which a block 5 having a rib 6 of complementary shape to said groove exerts pressure. Said pressure is thus distributed throughout the periphery of the bead 3 which acts inside the tire 1, and exclusively in the zone to be retreaded. It will be observed that the distribution of stresses on the periphery of the section of the bead or roll is more uniform as its thickness is substantially uniform around the rib 6 applying the compression stress. Flanges 3a secured by one edge only to the roll 3 adjacent to the points of separation of the blocks 5 prevent the formation of bulges due to the spacing apart of the blocks as pressure is applied.

The mould 2 which is formed by assembling a plurality of abutting segments along an arcuate line, has the feature comprising for each segment, a pair of elements 2a forming the mould proper rigidly fitted to a support 2b. Interchangeable shims 15 make it possible to adjust at will the spacing between the parts 2a, thereby providing for retreading tires of varying cross sections by simply changing the parts 2b and the shims 15 while preserving the actual mould. It will be observed that the engaging surfaces of both parts 2a upon the parts 2b is formed by a double cone frustum so as to avoid as far as possible the tendency of the parts to separate under the exerted pressure.

The mould is heated by means of a heating armature 7 the heading of which is herein insured for instance by steam circulated in both the internal recesses shown. It will be obvious that the armature could also be heated electrically. Such armature may for instance be hinged so as to be capable of being clamped upon the parts 2b. Mounting of the assembly is effected as follows: The rubber roll 3 is inserted into the tire; then additional gum is placed around the tire and the mould 2; the blocks 5 are mounted within the roll 3 and the entire assembly is placed on a pressure device to be described hereunder. Then the heating armature 7 may be put into place around the assembly; it then only remains to operate the pressure device to effect retreading.

The pressure device is formed by a truncated pyramid 8 (which also may be a truncated cone) which is caused to advance centrally of the apparatus so as to cam outwardly the push members 8a which in turn act upon the blocks 5 to apply the latter against the roll. The part 8 may for instance be driven outwardly by means of a piston 9 operated with any suitable hydraulic fluid admitted at its bottom through an aperture 10. After the piston has reached the upper end of its stroke, maximum pressure is applied to the blocks 5 and it is then simply necessary in order to release the latter, to evacuate the fluid acting upon the piston; a spring 11 then comes into action and restores the piston and the part 8 to their initial positions.

Figure 2:
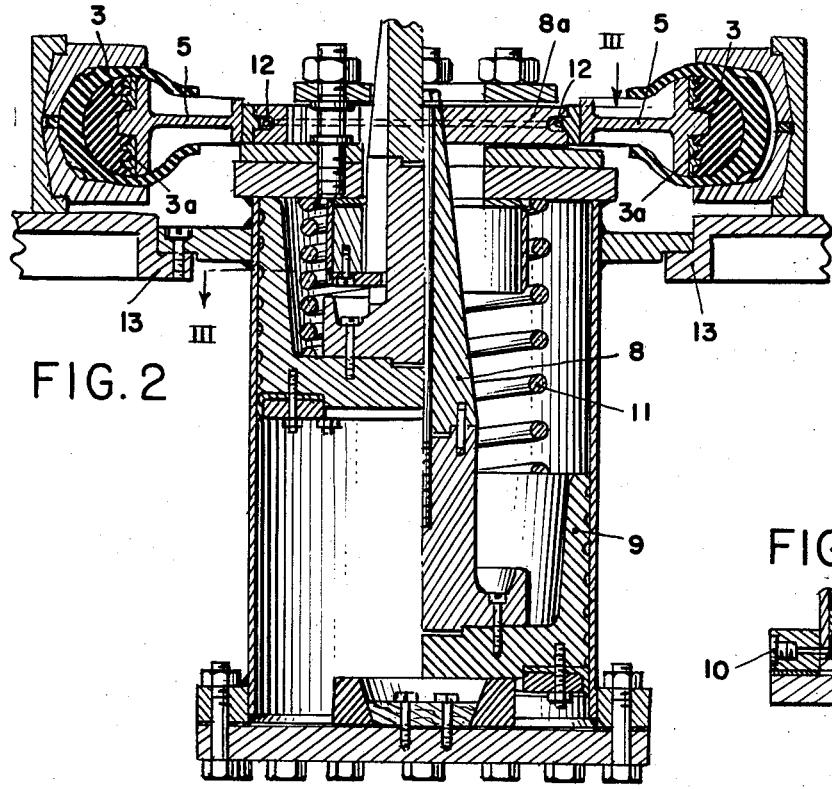
Fig. 2 is a longitudinal section through the apparatus for exerting retreading pressure upon the inner blocks, this view being a section on line II—II of Fig. 3, the tire being subjected to pressure on its left hand side and not on its right hand side.
Figure 4:
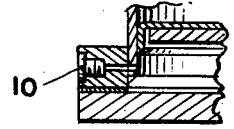
Fig. 4 is a section on line IV—IV of Fig. 3.
Figure 3:
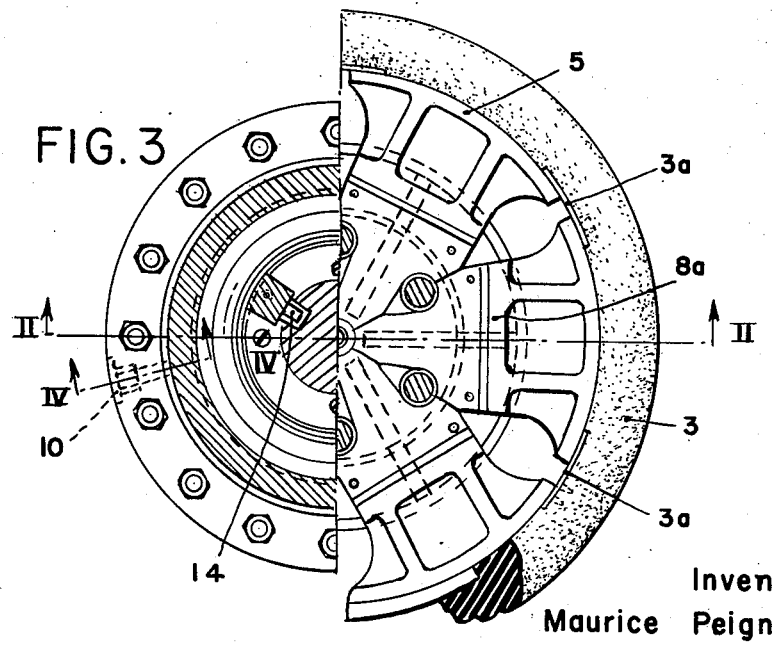
Fig. 3 is a section on line III—III of Fig. 2.

Fig. 2 shows at its right hand side, the piston in its lowermost position and at its left hand side the piston at its uppermost position.

The push members 8a which herein are shown to be six in number by way of example, have a groove formed therein in which is inserted a spring 12 adapted to retract them as the part 8 moves down.

The tire with its mould are mounted upon a table 13 arranged at a suitable level.

The support for the part 8 is provided with a groove 14 cooperating with a complementary guide to prevent said support from rotating in its up and down reciprocation.

It will of course be understood that the above described constructional details have been given merely by way of indication and that it may be possible to alter them considerably while remaining within the scope of the invention.

What I claim is:

1. A device for retreading tires which comprises in combination an outer mold adapted to engage the tread and part of the sides of said tire, an annular member of resilient material of substantially semi-circular cross-section adapted to be inserted into said tire to apply the outer surface thereof against said mold, an annular groove of generally trapezoidal cross-section formed in the radially inner surface of said annular member, first means including a rib complementary with said groove adapted to engage said inner surface of said member to regularly transmit pressure to the generally outwardly convex surface of said member, second means for applying to said first means an outwardly radial displacement and means for heating said mold to a vulcanizing temperature.

2. A device for retreading tires which comprises in combination an annular mold adapted to engage the tread and part of the sides of the tire therein, an annular resilient member of generally semi-circular cross-section adapted to be inserted into said tire to engage the outwardly directed inner surface thereof, an annular groove of generally trapezoidal cross-section formed in the generally flat radially inner surface of said member, a plurality of radially extending blocks adapted to engage said inner surface of said member each having a rib complementary with said groove, means for applying to said blocks simultaneously a vulcanizing pressure whereby said blocks are radially outwardly moved, said annular member is applied against the inner surface of said tire and the radially outwardly directed external surface of said tire is applied into said mold, and means for heating said mold to a vulcanizing temperature.

3. In a device for retreading tires in combination a mold adapted to engage a tire throughout the tread and part of the sides thereof while leaving the bead of said tire free, an annular rubber member of generally semi-circular outwardly convex cross-section adapted to be inserted in said tire, an annular groove of generally trapezoidal cross-section formed in the radially inner surface of said annular member, a plurality of radially movable blocks each having a trapezoidal rib complementary with said groove to be capable of transmitting pressure to said annular member in a substantially uniform manner, pressure means comprising a hydraulic cylinder disposed axially of said mold, a piston reciprocable in said cylinder and a hydraulic fluid passageway on said cylinder to move said piston therein, a tapered axially extending member rigid with said piston and radially extending pusher means adapted to be cammed by said tapered member in one direction to move said movable blocks radially outwardly to apply pressure to said annular member and said tire, and an annular outward reinforcing free member surrounding said mold and heating means in said reinforcing member to heat said mold to a vulcanizing temperature.

4. In a device for retreading tires in combination a mold adapted to engage a tire throughout the tread and part of the sides thereof while leaving the bead of said tire free, an annular rubber member of generally semi-circular outwardly convex cross-section adapted to be inserted in said tire, an annular groove of generally trapezoidal cross-section formed in the radially inner surface of said annular member, a plurality of radially movable blocks each having a trapezoidal rib complementary with said groove to be capable of transmitting pressure to said annular member in a substantially uniform manner, a plurality of flanges each secured by one edge to the inner part of said rubber member adjacent to the points of separation of said blocks, pressure means engaging said movable blocks for applying outwardly directed vulcanizing pressure to said blocks, said annular member and said tire, and an annular outward reinforcing member surrounding said mold, and heating means in said reinforcing member to heat said mold to a vulcanizing temperature.

MAURICE PEIGNEY.

REFERENCES CITED

The following references are of record in the file of this patent:

UNITED STATES PATENTS

| Number | Name | Date |
|---|---|---|
| 2,228,316 | James | Jan. 14, 1941 |
| 1,259,975 | Hewel | Oct. 21, 1941 |

FOREIGN PATENTS

| Number | Country | Date |
|---|---|---|
| 115,839 | Austria | Jan. 10, 1930 |
| 607,058 | France | June 25, 1926 |